Patented June 1, 1954

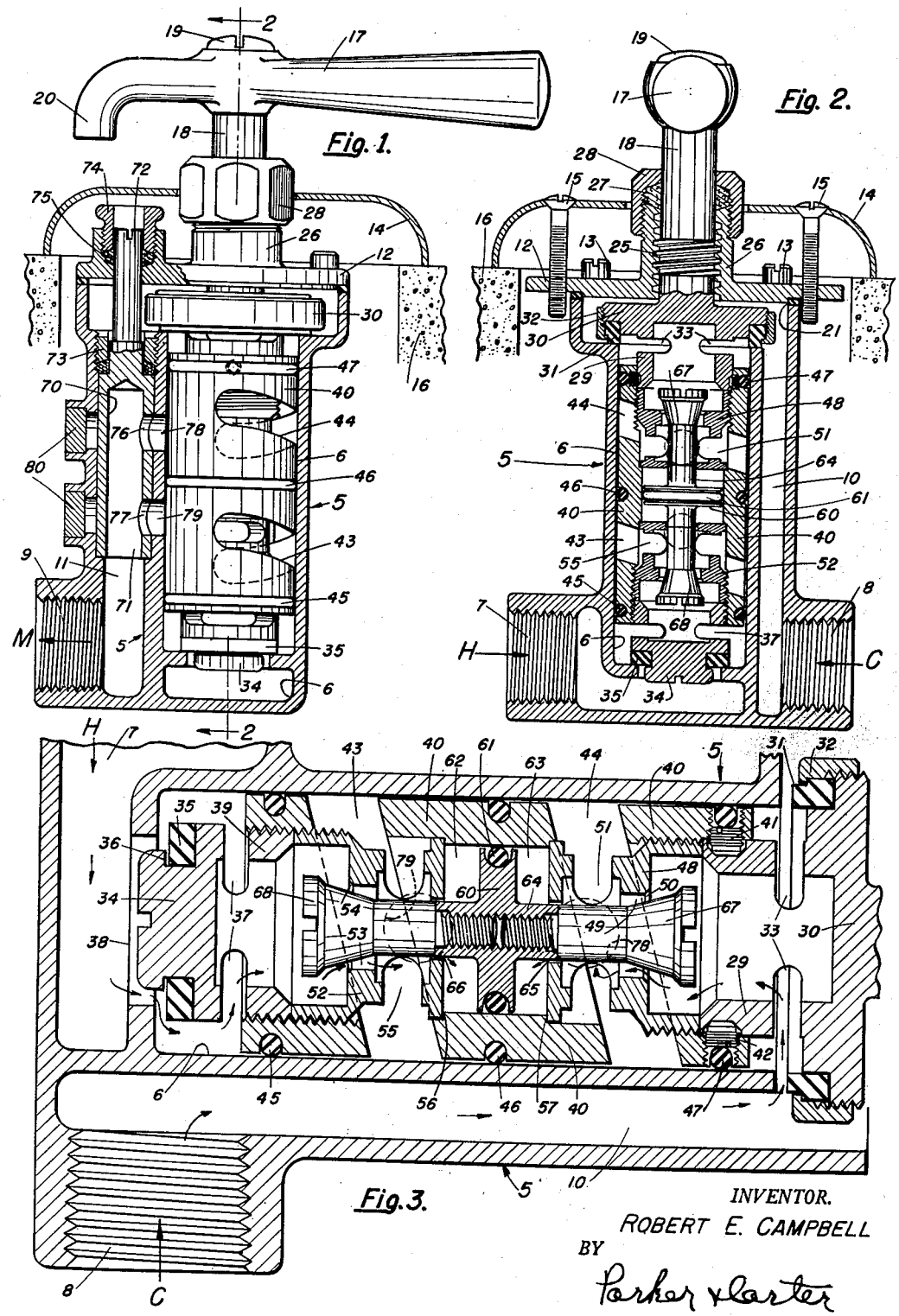

2,679,861

UNITED STATES PATENT OFFICE 2,679,861

MIXING VALVE

Robert E. Campbell, Chicago, Ill., assignor to Sloan Valve Company, Chicago, Ill., a corporation of Illinois Application March 23, 1951, Serial No. 217,260

12 Claims. (Cl. 137—607)

This invention relates in general to mixing valves for hot and cold fluids, but more particularly to mixing valves in which the fluid outlet temperature is manually adjusted, and the principal object of the invention is to provide a new and improved fluid mixing valve in which the user is prevented from being scalded in case there is a failure or drop in the cold water pressure.

A further object of the invention is to design a new and improved mixing valve for mixing fluids of different temperatures and pressures in which there is provided means for regulating the flow of the fluids through the valve to cause delivery of a mixture at a relatively uniform temperature irrespective of variations in the inlet fluid pressures.

Another object is to design a novel mixing valve having means therein for controlling the volume of fluid delivered together with means for controlling the mixed temperature output irrespective of inlet fluid pressure variations.

Another object of the invention is to provide a novel arrangement of O rings in a fluid mixing valve in which friction between the various moving parts is reduced to a minimum and crossflow between the different fluid ports is prevented.

A further object is to design a new and improved fluid mixing valve having separate means for manually adjusting the desired temperature and volume of the fluid output, together with automatic pressure equalizing means for preventing an excess of the hot fluid when the cold fluid fails or drops in pressure.

A still further object of the invention is to provide a new and improved fluid mixing valve in which the parts are readily accessible from the front of the device for inspection and repair, which is simple and compact in construction, is reliable and positive in operation, and in which close manufacturing tolerances are not necessary.

The foregoing and other objects and features of the invention not particularly pointed out, will be apparent from the following description and the accompanying drawing, and will be more particularly pointed out in the claims. A preferred embodiment of the invention is illustrated in the drawings in which:

Fig. 1 is a partial cross-sectional side view through the mixing valve showing the invention;

Fig. 2 is a cross-section taken along the line 2—2 of Fig. 1; while

Fig. 3 is an enlarged cross-section of the sleeve valve and the pressure equalizing valve in the valve body.

The present mixing valve is applicable for installations such as are provided in connection with shower heads, faucets, bath tubs, lavatories and other fixtures using both hot and cold water in mixed amounts. In such installations, a hazard problem is presented whenever the pressures of either the hot or cold water is reduced or entirely shut off, due usually to operation of other fixtures connected to the same plumbing system. In such event, the user of the mixing valve is either scalded and seriously injured, or chilled by a surge of cold water. By the use of a pressure equalizing valve, this hazard and discomfort is alleviated so that upon a failure of cold water pressure for example, the hot water will be prevented from flowing excessively from the outlet. It is also desirable in such installations that the water, in addition to being delivered at a predetermined desired temperature, be controlled as to the volume output thereof.

In previously known types of hot and cold water mixing valves, the problem was also present of the moving parts of the valve, such as the temperature controlling element or the pressure equalizing element, becoming stuck in one position due usually to the accumulation of sediment or lime deposits on the moving parts. In such an event, the safety features of the device would be inoperative. By the use of O rings in the sleeve valve and pressure equalizing valve, sticking of the moving elements is entirely obviated. In the present invention, a sliding sleeve valve is provided with O rings and arranged so that no close manufacturing tolerances are required to fit the same for operation in the casing, the O rings being effective also to prevent sticking and at the same time prevent cross fluid flow between the various hot and cold water ports in the valve. Similarly, by the use of an O ring in the pressure equalizing piston, friction is reduced to a minimum, sticking is prevented, and the over-all size of the element considerably reduced.

Referring now more particularly to the drawings, Figs. 1 and 2, the reference character 5 indicates generally the body or casing of the mixing valve, which is preferably constructed of a brass casting or other suitable material. It is provided with a longitudinal bore 6, a tapped hot water inlet 7, a cold water inlet 8, and a mixed temperature water outlet 9. Parallel to and adjacent the bore 6 of the body is a passageway 10 leading from the cold inlet 8 to the upper end of the bore 6. A second bore 11 (see Fig. 1) also extends parallel to the bore 6 and constitutes the water mixing chamber leading to the outlet 9 for delivery of the mixed temperature fluid. The upper end of the bore 6 is closed off by a cover plate 12 held in place on the casing 5 by means of a number of screws 13, with a gasket 21 for sealing the joint. An escutcheon plate 14 is held in place on the cover plate 12 by means of a number of screws 15 to provide a finished appearance to the mixing valve casing 5 when it is mounted for example, upon a wall surface such as 16. This escutcheon plate 14 may be provided with suitable indicia indicating the position of the valve handle. The valve handle 17 is attached to the operating stem 18 of the mixing valve by means of screw 19 and is provided on one end with a pointer 20 to indicate the position of the handle. The handle stem 18 is suitably threaded as shown at 25 in a boss 26 extending upwardly integral from the mounting plate 12 and is provided with a suitable packing 27 and packing nut 28 for preventing leakage.

The lower end of the handle stem 18 in the top of bore 6 is formed to provide a circular cold inlet valve disc 30 having a rubber valve portion 31 adapted to seat against and around the upper end of the casing bore 6, as shown. A flanged member 32 holds the valve member 31 in proper position on the valve disc 30. Extending below the valve disc 30, and formed integral therewith, is a cup-shaped portion 29 having inlet passages or ports 33 extending through the sides thereof.

At the lower end of the bore 6 and in axial alignment with the cold valve disc 30 is the hot water inlet valve disc 34, carrying a rubber valve member 35 in a circular slot 36, which valve member is adapted to seat against the lower end of the opening 38 in casing bore 6. The valve disc 34 is provided with a cup-shaped projection 39 having passageways or ports 37 cut in the side thereof. With this construction, it will be apparent that whenever the hot and cold inlet valve members 31 and 35 are off of their seats, the hot and cold water will be admitted through passageways 33 and 37 into the interior of the mixing valve. The cup-shaped member 39 is threaded into the inner opening of a sleeve valve member 40 as shown.

The cylindrical sleeve valve 40 for regulating the flow of tempered water from the device is arranged within the bore 6 for rotatable and reciprocal movement therein and is securely attached to the valve stem 18 for operation by a pair of set screws 41 and 42 threaded into the cold valve cup member 29. A pair of spiral-shaped slots 43 and 44 are arranged in spaced relationship in the sleeve valve member 40, one slot 43 being for the hot water and the other slot 44 for the cold water. These slots extend approximately half-way around the circumference of cylinder 40, as is more clearly seen in Fig. 1. A series of O ring packings 45, 46 and 47 of soft rubber are arranged in spaced relationship around the sleeve valve 40, as indicated, and provide a fluid-tight seal on each side of the slots 43 and 44 and between the slots and the inlet valves 31 and 35. The O rings also enable greater tolerances to be maintained in machining the bore 6 with respect to the sleeve member 40, as well as providing for reduction in friction to the turning of the sleeve valve 40 by the handle 17. It will be obvious that rotation of the handle 17 will cause the stem 18 to rotate the sleeve valve 40 inward or outward with respect to the bore 6, as well as move the inlet valves 31 and 35 with respect to their seats.

The pressure equalizing unit is arranged within the sleeve valve 40 and comprises at one end a cup-shaped cold valve plug 48 threaded into the sleeve member 40 at the upper end thereof, having an axial opening 49 therein surrounded by a valve seat 50. The sides of the valve plug 48 also have inlet passages or ports 51 registering with the sleeve valve slot 44. A similar hot water valve plug 52, cup-shaped, threads into the other end of the sleeve valve 40, and is provided with an axial bore 53, as well as a valve seat 54. The sides of the plug 52 have ports 55 which register with the hot water slot 43 in the sleeve 40. It will be seen that the valve plugs 48 and 52 are rigidly held in position within the valve sleeve 40 and are movable therewith, the valve plug 48 being threaded inside the sleeve 40 and abutting on shoulder 57 formed therein, while valve plug 52 is similarly arranged for abutment against a shoulder 56 in the sleeve.

The movable portion of the pressure equalizing valve is arranged for reciprocal movement within the cylindrical sleeve member 40, and comprises a piston in the form of a disc 60 having a groove in its periphery within which an O ring 61 is adapted to fit. The O ring 61 is in sliding contact with the inner walls of the sleeve member 40 and provides separation between two fluid pressure chambers 62 and 63 on each side of the piston 60, and between the bottom end of the valve plugs 48 and 52. Extending from opposite sides axially of the piston 60 is a valve stem 64 which projects through axial openings 65 and 66 in the bottom of valve plugs 48 and 52, respectively, with, however, a certain amount of clearance, as shown. One end of the valve stem 64 threadedly supports a cold water valve head 67 adapted to cooperate with the cold water seat 50, while the opposite end of the stem 64 carries the valve head 68, arranged to cooperate with the valve seat 54.

It will be obvious that movement of the piston 60 due to variations in pressure existing in pressure chambers 62 and 63, will cause longitudinal movement of the valve stem 64, and consequently vary the position of the valve heads 67 and 68 with respect to their associated valve seats 50 and 54.

In order that the volume of the mixed hot and cold water delivered from the mixing outlet 9 can be regulated, a volume control valve is provided, comprising a sleeve valve 70 arranged within the bore 11, having a central opening 71 leading to the mixed outlet 9. A regulating stem 72 extends upwardly from the sleeve valve 70 and is held in position and sealed in the bore 11 of the casing 5 by means of a packing nut 73. A similar packing nut 74 and packing 75 seal the upper end of the stem 72 in the cover plate 12. A cold water port 76 and a hot water port 77 are bored in the side of the volume sleeve valve 70 and are adapted to be variably registered with associated ports 78 and 79 extending through the wall of the bore 6 of casing 5, as shown in Fig. 1. Rotating the volume control stem 72 will therefore regulate the volume output from the mixed outlet 9. A further purpose of the hollow sleeve valve 71 is to provide a mixing chamber for mixing the hot and cold water within the bore 11 prior to discharge from the opening 9. The plugs 80 in the casing 5 are for the purpose of closing openings used for boring the ports 78 and 79 in the casing when the casing is manufactured.

From the foregoing description of the various elements, it will be seen that rotating the valve handle 17 moves the hot and cold water inlet valves 31 and 35 with respect to their valve seats, and at the same time rotates the sleeve valve member 40 spirally to variably register the slots 43 and 44 with respect to the outlet ports 78 and 79 to regulate the temperature output. Adjusting the volume control valve stem 72 variably registers the ports 76 and 77 with respect to the passages 78 and 79 to vary the volume output of the mixed water. Movement of the pressure equalizing piston 60 variably positions the hot and cold valve heads 67 and 68 with respect to their valve seats 50 and 54 to maintain the pressure substantially equalized in the sleeve valve slots 43 and 44.

Fig. 3 indicates the position of the mixing valve with the inlet valves 31 and 35 shown partially open. The path of the cold water extends from the inlet 8, passage 10, through the valve member 31 and its associated valve seat on the end of bore 6, then into the interior of the cup-shaped valve member 29, through its slots 33, around the cold valve head 67, through valve seat 50, through slots 51 in valve plug 48, and into the cold water slot 44. From there, the cold water passes through ports 78 and 76 into the mixing chamber 71 of the volume control valve 70.

The hot water flow takes place over a similar path from hot water inlet 7, opening 38 and hot water valve 35 and its associated seat, slots 37 into the cup-shaped portion 39 of inlet valve 34, around valve head 68, valve seat 54 of valve plug 52 and outwardly through the slots 55 into the sleeve slot 43. From there the hot water passes through openings 79 and 77 into the mixing chamber 71, where it is mixed with the cold water coming from opening 76 and both then pass out of the mixed outlet 9.

Referring again to the passage of fluid into the pressure equalizing valve, a portion of the fluid passes into the pressure chambers 62 and 63 through the clearances 65 and 66, provided around valve stem 64, so that pressures are equalized on both sides of the piston 60. In the normal operation, assuming that the pressure of the liquid entering the inlet valves 31 and 35 is approximately equal, the piston 60 will remain in such position that an equal amount of fluid will pass through the hot and cold valve seats 50 and 54. In case, however, there is a fluctuation in the pressures of either liquid, it will be immediately manifest in the pressure chambers 62 or 63 and the greater pressure will exert itself on the side of the piston upon which it is effective, causing the piston to move in the opposite direction to tend to close either of the valve heads 67 and 68 on the associated valve seats, depending upon which one the pressure is the greatest. Any variation of pressure of either of the fluids will automatically move the equalizing valve in the proper direction to maintain the fluid mixture at the same temperature irrespective of variations in the pressure of the liquid.

It will be obvious that the O rings 45, 46 and 47 are for effective sealing of the various fluid passages and ports from each other to prevent by-passing, and that they are equally effective to reduce friction in the operation of the sleeve valve 40 when it is manually adjusted. Since close tolerances are likewise not required, this makes for simplification in manufacture. Similarly, by such wide manufacturing tolerances, any foreign elements or sediment lodging in the device will not act to cause sticking of the sleeve valve member, and even if it does, the forceful manual rotatable operation of the sleeve 40 by handle 17 will quickly dislodge the same. It is likewise evident that the complete operating unit is readily removable for inspection from the front of the casing 5 by merely removing the cover plate 12 and screws 13 and pulling the whole unit out.

The hot and cold inlet valves 31 and 35 being arranged on opposite ends of the sleeve valve 40, effectively control the inlet flow of hot and cold water into the mixing valve and pressure equalizing mechanism. These inlet valves are arranged to open and close simultaneously by rotation of the valve handle 17. The spiral shaped sleeve valve slots 43 and 44, however, are arranged in such a manner with respect to their associated outlet ports 78 and 79 that rotation of the sleeve 40 causes the cold water to pass from the slot 44 through outlet passage 78 prior to the opening of the passage between hot water slot 43 and its associated port 79. This is a desirable feature and is clearly seen in Fig. 1. By the provision of the spiral shaped slots 43 and 44 cooperating with their respective ports 78 and 79, an extreme accurate and reliable range of temperature adjustment is secured, not possible with other types of temperature controls.

By providing an O ring on the pressure equalizing piston 16, this piston can be made considerably smaller, as well as reduce friction in its operation, rendering it more sensitive. The valve heads 67 and 68 are so arranged with respect to their associated valve seats 50 and 54 that they have a dash-pot action in order to prevent sudden surges in the flow of fluid from having any effect upon their operation. By the use of valve heads rather than sleeve members, close tolerances are not required, and the chances of sticking are entirely eliminated. Also with such an arrangement as disclosed a compact and simple unit, reliable in operation, is produced.

In the operation of the device, the handle 17 is rotated to the desired temperature point indicated on the escutcheon plate 14 by the pointer 20. This causes the hot and cold valve members 31 and 35 to move away from their associated valve seats in the bore 6. At the same time, in accordance with the rotation of the sleeve valve member 40, the hot and cold sleeve valve slots 43 and 44 are registered a variable amount with respect to their outlet ports 78 and 79. The volume adjustment valve 72 having been previously rotated with respect to the openings 78 and 79, a predetermined mixture of hot and cold water is delivered from the mixing opening 9. This predetermined temperature will be maintained irrespective of any pressure variations of either the hot or cold inlet water by the pressure equalizing piston 60 functioning to automatically maintain equal pressures on opposite sides of the piston. In the event there is a drop or complete failure of, for example, the cold water, the hot water pressure prevailing in pressure chamber 62 will cause movement of piston 60 in a right-hand direction, further opening the valve head 67 from its seat 50 and tending to close or throttle valve head 68 with respect to its seat 54, thereby reducing the flow from sleeve slot 43 and increasing it from the cold slot 44.

While there has been illustrated and described the best embodiment of invention now known, it will be apparent to those skilled in the art that changes may be made in the form of the device disclosed without departing from the spirit of

What is claimed is:

1. In a mixing valve for fluids of different temperatures, a casing having a cylindrical bore therein, a hot fluid inlet valve on one end of said bore and a cold fluid inlet valve on the other end of said bore, a sleeve valve in said bore between said inlet valves and connected thereto, a handle operated stem for opening and closing both of said inlet valves and for rotating said sleeve valve in said bore, said bore having a pair of outlet passages in the wall thereof, one for the hot fluid and one for the cold fluid, said sleeve valve having a pair of spiral shaped slots therein, one for the hot fluid and one for the cold fluid, said slots registering a variable amount with the corresponding outlet passages in said bore in accordance with the setting of said handle stem, said casing having a fluid mixing chamber therein, a sleeve valve in said mixing chamber having inlet passages therein registering a variable amount with said bore outlet passages to regulate the fluid volume output, the hot and cold fluids from said outlet passages being mixed in said last sleeve valve, and said last sleeve valve having an outlet therein for the mixed fluids.

2. In a mixing valve for fluids of different temperatures, a casing having a cylindrical bore therein, separate hot and cold fluid inlet valves on opposite ends of said bore, a temperature control sleeve valve in said bore arranged between said inlet valves and connected thereto, a handle operated stem for opening and closing both of said inlet valves and for rotating said sleeve valve in said bore, said bore having separate hot and cold fluid outlet passages extending from the walls thereof, said sleeve having separate hot and cold fluid spiral shaped slots therein associated with the respective hot and cold fluid inlet valves, said sleeve valve slots adapted to register a variable amount with the associated hot and cold fluid outlet passages in said bore in accordance with the setting of said handle stem, said casing having a second bore adjacent said first bore, and a volume control sleeve valve in said second bore having hot and cold inlet passages therein registering with the hot and cold outlet passages in said first bore a variable amount in accordance with the setting of said volume control sleeve valve, said volume control sleeve constituting a mixing chamber for the hot and cold fluids, and said second bore having a mixed fluid outlet extending from said second bore.

3. In a mixing valve for fluids of different temperatures, a casing having a cylindrical bore therein, separate hot and cold fluid inlet valves on opposite ends of said bore, a temperature control sleeve valve in said bore arranged between said inlet valves and connected thereto, a handle operated stem for opening and closing both of said inlet valves and for rotating said sleeve valve in said bore, said bore having separate hot and cold fluid outlet passages extending from the walls thereof, said sleeve valve having separate hot and cold fluid spiral shaped slots therein associated with the respective hot and cold fluid inlet valves, said sleeve slots adapted to register a variable amount with the associated hot and cold fluid outlet passages in said bore in accordance with the setting of said handle stem, said casing having a second bore adjacent said first bore, and a volume control sleeve valve in said second bore having hot and cold inlet passages therein registering with the hot and cold outlet passages in said bore a variable amount in accordance with the setting of said volume control sleeve valve, said volume control sleeve constituting a mixing chamber for the hot and cold fluids, and said casing having a mixed fluid outlet extending from said second bore, and a pressure equalizing piston in said temperature control sleeve valve between said inlet valves and separating the hot and cold fluids passing through said spiral slots.

4. In a mixing valve for inlet fluids of different temperatures, a casing having a main bore therein, hot and cold fluid inlet valves having valve seats on opposite ends of said bore, a temperature control sleeve valve in said bore between said inlet valves, said inlet valves being attached to said sleeve valve, an operating stem for opening said inlet valves from their seats in the bore and for rotating said sleeve valve, said sleeve valve having separate spiral shaped slots therein for the hot and cold fluids, said bore having separate ports in the walls thereof for the hot and cold fluids, said spiral shaped slots adapted to register variably with said bore ports as said sleeve valve is rotated, said casing having a second bore therein, a volume control sleeve valve in one end of said second bore, said volume control sleeve valve having separate ports therein for the hot and cold fluids adapted to register variably with the fluid ports in said main bore as the volume control sleeve valve is rotated, the interior of said volume control sleeve valve constituting a mixing chamber for the fluids, and said second bore having an outlet port for the mixed fluids extending therefrom.

5. In a mixing valve for fluids of different temperatures, a casing having a main bore and a second bore therein, said bores being arranged parallel to one another and having separate connecting ports in the walls thereof for the hot and cold fluids, a temperature control sleeve valve in said main bore and a volume control valve in said second bore, said volume control valve having a fluid mixing chamber therein and separate hot and cold fluid ports in the wall of said chamber adapted to variably register with the ports between said bores, said second bore having an outlet port therein for the mixed fluids, said temperature control valve having separate spiral shaped grooves therein for the hot and cold fluids adapted to variably register with the ports between said bores, hot and cold fluid valve seats arranged on opposite ends of said main bore, hot and cold inlet valves on said seats attached to opposite ends of said temperature control valve, means for rotating said temperature control valve and both of said inlet valves simultaneously to variably pass the hot and cold fluids into said volume control valve and then out of the mixed fluid outlet, and a fluid pressure equalizing piston inside said temperature control valve between said inlet valves.

6. In a mixing valve for fluids of different temperatures, a casing having a main bore and a second bore therein, said bores being arranged parallel to one another and having separate connecting ports in the walls thereof for the hot and cold fluids, a temperature control sleeve valve in said main bore and a volume control sleeve valve in said second bore, said volume control valve having a fluid mixing chamber therein and separate hot and cold fluid ports in the wall of said chamber adapted to variably register with the ports between said bores, said second bore having an outlet port therein for the mixed fluids, said temperature control valve having separate spiral shaped grooves therein for the hot and cold fluids adapted to variably register with the associated ports between said bores, hot and cold fluid valve seats arranged on opposite ends of said main bore, hot and cold fluid inlet valves on said seats attached to opposite ends of said temperature control valve, means for rotating said temperature control valve and both of said inlet valves simultaneously to variably pass the hot and cold fluids into said volume control valve and then out of the mixed fluid outlet, a fluid pressure equalizing piston inside said temperature control valve between said inlet valves, and separate control valves on said equalizing piston for the hot and cold fluids for controlling fluid flow between said inlet valves and said spiral slots.

7. In a mixing valve for inlet fluids of different temperatures, a casing having a bore therein, hot and cold fluid inlet valves arranged on opposite ends of said bore and having valve seats in said bore, a temperature control sleeve valve in said bore between said inlet valves and attached thereto, an operating stem for opening said inlet valves and for rotating said sleeve valve, said sleeve valve having separate spiral shaped slots therein for the hot and cold fluids, there being separate hot and cold fluid outlet ports in the bore walls with which said spiral slots are adapted to be variably registered when the sleeve valve is turned to vary the temperature output, a pressure equalizing piston inside said sleeve valve arranged between said inlet valves and said spiral slots, a valve stem projecting from opposite sides of said equalizing piston, a separate valve head for the hot and cold fluids carried on each end of said valve stem, a separate valve plug on each end of said sleeve valve having a valve seat therein for each valve head to seat upon, said valve stem extending through each valve plug and being guided therein, said valve plugs having ports therein registering with the sleeve valve slots.

8. In a mixing valve for inlet fluids of different temperatures, a casing having a bore therein, hot and cold fluid inlet valves arranged on opposite ends of said bore and having valve seats in said bore, a temperature control sleeve valve in said bore between said inlet valves and attached thereto, an operating stem for opening said inlet valves and for rotating said sleeve valve, said sleeve valve having separate spiral shaped slots therein for the hot and cold fluids, there being separate hot and cold fluid outlet ports in the bore walls with which said spiral slots are adapted to be variably registered when the sleeve valve is turned to vary the temperature output, a pressure equalizing piston slidable inside said sleeve valve between said inlet valves and said spiral slots, a valve stem projecting from opposite sides of said piston, a separate hot and cold fluid valve head attached to each end of said valve stem, a separate valve plug on each end of said sleeve valve having a valve seat therein for each valve head to seat upon, said valve stem extending through each valve plug and having a sliding fit therewith to guide the movements of said valve stem, there being sufficient clearance around the valve stem in each of said valve plugs to enable fluid pressure to be exerted on opposite sides of said equalizing piston, said valve plugs having fluid ports therein leading into said sleeve valve slots, and an O ring on said equalizing piston.

9. In a mixing valve for inlet fluids of different temperatures, a casing having a bore therein, hot and cold fluid inlet valves arranged on opposite ends of said bore and having valve seats in said bore, a temperature control sleeve valve in said bore between said inlet valves and attached thereto, an operating stem for opening said inlet valves and for rotating said sleeve valve, said sleeve valve having separate spiral shaped slots therein for the hot and cold fluids, there being separate hot and cold fluid outlet ports in the bore walls with which said spiral slots are adapted to be variably registered when the sleeve valve is turned to vary the temperature output, a pressure equalizing piston slidable inside said sleeve valve between said inlet valves and said spiral slots, a valve stem projecting from opposite sides of said piston, a separate valve head carried on each end of said valve stem, a separate valve plug on each end of said sleeve valve having a valve seat therein for each valve head to seat upon, said valve plugs forming a pressure chamber on each side of said equalizing piston, said valve plugs having an opening therein through which said valve stem slidably extends to guide the stem and with sufficient clearance to enable fluid pressure to be exerted on opposite sides of said equalizing piston, said valve plugs having fluid ports therein leading into said sleeve valve slots, and an O ring packing on said equalizing piston separating said pressure chambers.

10. In a mixing valve for inlet fluids of different temperatures, a casing having a main bore therein, hot and cold fluid inlet valves having valve seats on opposite ends of said bore, a temperature control sleeve valve in said bore between said inlet valves, said inlet valves being attached to said sleeve valve, an operating stem for opening said inlet valves from their seats in the bore and for rotating said sleeve valve, said sleeve valve having separate spiral shaped slots therein for the hot and cold fluids, said bore having separate ports in the walls thereof for the hot and cold fluids, said spiral shaped slots adapted to register variably with said bore ports as said sleeve valve is rotated, O rings on said sleeve valve providing a seal between said sleeve valve and the walls of said bore, said O rings also providing a seal between both said spiral shaped slots and between each spiral slot and said inlet valve, said casing having a second bore therein, a volume control sleeve valve in one end of said second bore, said volume control sleeve valve having separate ports therein for the hot and cold fluids adapted to register variably with the fluid ports in said main bore as the volume control sleeve valve is rotated, the interior of said volume control sleeve valve constituting a mixing chamber for the fluids, and said second bore having an outlet port for the mixed fluids extending therefrom.

11. In a fluid mixing valve having a hollow sleeve member for regulating the temperature of the fluid output, a pressure equalizing valve in said sleeve valve member comprising a piston having an O ring thereon slidable in said sleeve valve member, cup-shaped valve plugs on opposite sides of said piston and forming therewith separate pressure chambers, means for supporting said valve plugs in said sleeve valve member, a valve stem extending from opposite sides of said piston and through an opening in the bottom of each of said valve plugs, a valve head on each end of said stem positioned in the open end of said valve plugs, a partition formed across each valve plug having an opening therein and valve seats for said valve heads around said partition openings, there being fluid passages extending through said partition openings around said valve stem and outward through the sides of said valve plugs, the bottom opening in each valve plug serving as a guide for the valve stem and providing a restricted fluid passage into said pressure chamber whereby rapid surges of fluid pressures are dampened before being exerted in the pressure chambers against said piston, the fluid into said pressure chamber being controlled at said valve seats by said valve heads.

12. In a fluid mixing valve having a hollow sleeve valve member for regulating the temperature of the fluid output, a pressure equalizing valve within said sleeve member having a piston slidable therein, separate cup-shaped valve plugs arranged on opposite sides of said piston and secured to said sleeve member, the bottom of each valve plug having an opening therein, a pressure chamber being formed between said valve plug bottom and said piston, a partition formed across each valve plug between the bottom and top thereof, said partition having a fluid inlet opening therein surrounded by a valve seat, a separate valve stem extending from opposite sides of said piston and passing through both the partition and bottom openings of said valve plugs, a valve head on the end of each valve stem and operable against the associated valve seat in the partition, said valve plugs each having fluid outlet openings arranged in the sides thereof and between the bottom of the valve plug and the partition therein, the bottom opening in each valve plug serving as a guide for the valve stem and also providing a restricted fluid passage into said pressure chamber so that rapid surges of fluid inlet flow will be dampened before reaching said pressure chamber whereby extreme vacillating of said piston is prevented.

References Cited in the file of this patent

UNITED STATES PATENTS

| Number | Name | Date |
|---|---|---|
| 1,494,796 | Muntz | May 20, 1924 |
| 2,443,499 | Fraser | June 15, 1948 |
| 2,494,044 | Jurisich et al. | Jan. 10, 1950 |
| 2,501,657 | Barkelew | Mar. 28, 1950 |

FOREIGN PATENTS

| Number | Country | Date |
|---|---|---|
| 44,650 | Switzerland | Apr. 14, 1908 |